(12) United States Patent
Wang (10) Patent No.: US 12,125,366 B2
(45) Date of Patent: Oct. 22, 2024

(54) METHOD, SYSTEM AND IMAGE-CAPTURING DEVICE FOR PHYSICAL-DISTANCING DETECTION

(71) Applicant: Alpha Networks Inc., Hsinchu (TW)

(72) Inventor: Cheng-Hsiang Wang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 415 days.

(21) Appl. No.: 17/573,039

(22) Filed: Jan. 11, 2022

(65) Prior Publication Data

US 2022/0398912 A1 Dec. 15, 2022

(30) Foreign Application Priority Data

Jun. 11, 2021 (TW) .................................. 110121317

(51) Int. Cl.
  *G06T 7/73* (2017.01)
  *G06T 7/60* (2017.01)
  *G08B 21/24* (2006.01)

(52) U.S. Cl.
  CPC .............. *G08B 21/245* (2013.01); *G06T 7/60* (2013.01); *G06T 7/73* (2017.01);
  (Continued)

(58) Field of Classification Search
  CPC ...... G08B 21/245; G08B 21/22; G08B 21/24; G06T 7/60; G06T 7/73;
  (Continued)

(56) References Cited

U.S. PATENT DOCUMENTS 10,097,737 B2    10/2018   Liu et al.
2011/0128388 A1   6/2011   Pai et al.
(Continued)

FOREIGN PATENT DOCUMENTS

CN      107508942     12/2017
CN      108476288      8/2018
(Continued)

OTHER PUBLICATIONS

China National Intellectual Property Office, OA issued on Dec. 27, 2023.
Taiwan Intellectual Property Office, OA issued on Mar. 18, 2022.

*Primary Examiner* — Stephen P Coleman
(74) *Attorney, Agent, or Firm* — WPAT, P.C (57) ABSTRACT

A system for physical-distancing detection in a specified area includes a locator locating a positioning quadrangle plane in a specified area; an image-capturing device obliquely capturing an image of the specified area to generate a captured image of the specified area; and a coordinate converter defining a coordinate conversion function according to raw coordinates of selected points of the positioning quadrangle plane in the captured image of the specified area and reference coordinates of the selected points of the positioning quadrangle plane in an overlooked image of the specified area. The image-capturing device converts raw coordinates of the captured image of the specified area into converted coordinates of the overlooked image of the specified area by way of the coordinate conversion function, determines a physical-distancing condition between two persons according to the converted coordinates, and automatically takes an action corresponding to the physical-distancing condition.

20 Claims, 8 Drawing Sheets

(52) U.S. Cl.
    CPC .............. *G06T 2207/30196* (2013.01); *G06T 2207/30204* (2013.01); *G06T 2207/30232* (2013.01)

(58) Field of Classification Search
    CPC . G06T 2207/30196; G06T 2207/30204; G06T 2207/30232; G06V 20/52; G06V 40/103; H04N 5/76
    USPC ........................................................ 382/103
    See application file for complete search history.

(56) References Cited

U.S. PATENT DOCUMENTS

| | | | |
|---|---|---|---|
| 2014/0118498 A1 | 5/2014 | Lee et al. | |
| 2018/0082440 A1* | 3/2018 | Nakamura | ................ G06T 7/74 |

FOREIGN PATENT DOCUMENTS

| | | |
|---|---|---|
| CN | 111950491 | 11/2020 |
| JP | 2000227963 | 8/2000 |
| KR | 102183285 | 11/2020 |
| TW | I398160 B | 6/2013 |
| TW | I486915 B | 6/2015 |
| TW | I601423 B | 10/2017 |
| TW | I692727 B | 5/2020 |
| TW | I716009 B | 1/2021 |
| TW | 202113674 A | 4/2021 |

* cited by examiner

METHOD, SYSTEM AND IMAGE-CAPTURING DEVICE FOR PHYSICAL-DISTANCING DETECTION

FIELD OF THE INVENTION

The present invention relates to system and method for physical-distancing detection, and more particularly to system and method for physical-distancing detection by way of an image analysis technology. The present invention also relates to an image-capturing device for use in the system to execute the image analysis technology.

BACKGROUND OF THE INVENTION

For preventing from cluster infection, physical distancing among people is required, particularly in a space where air circulation is poor. Currently, physical distancing is basically detected and maintained artificially, for example, by marking on the ground or setting up markers, and managing people by staff on duty. Unfortunately, such means spends relatively high laboring and cost but gets relatively low efficiency. For example, in a large and busy space, e.g., a hypermarket or an amusement park, a numerous number of markings or markers, as well as managing staff, would be required. Therefore, there is a demand for enhancing physical-distancing effects and efficiency.

SUMMARY OF THE INVENTION

The present invention provides system and method for physical-distancing detection, with which the physical-distancing effects and efficiency can be improved. In response to the result of physical-distancing detection, the system can automatically take necessary actions according to the physical-distancing condition.

The present invention also provides an image-capturing device, which can be used in a system for physical-distancing detection to execute a method for physical-distancing detection, with which the physical-distancing effects and efficiency can be improved.

In an aspect, the present invention provides a system for physical-distancing detection in a specified area. The system includes a locator locating a positioning quadrangle plane in a specified area; an image-capturing device obliquely capturing an image of the specified area to generate a captured image of the specified area; and a coordinate converter defining a coordinate conversion function according to raw coordinates of selected points of the positioning quadrangle plane in the captured image of the specified area and reference coordinates of the selected points of the positioning quadrangle plane in an overlooked image of the specified area. The image-capturing device converts raw coordinates of the captured image of the specified area into converted coordinates of the overlooked image of the specified area by way of the coordinate conversion function, determines a physical-distancing condition between two persons according to the converted coordinates, and automatically takes an action corresponding to the physical-distancing condition.

In an aspect, the present invention provides an image-capturing device adapted to be used for physical-distancing detection. The image-capturing device includes an image-pickup module obliquely capturing an image of the specified area to generate a captured image of the specified area; a data storage module storing therein a coordinate conversion function; and a processor coupled to the image-pickup module and the data storage module, and converting raw coordinates of the captured image of the specified area into converted coordinates of an overlooked image of the specified area by way of the coordinate conversion function. A physical-distancing condition between two persons is determined by the processor according to the converted coordinates, and an action corresponding to the physical-distancing condition is automatically taken by the image-capturing device.

In a further aspect, the present invention provides a method for physical-distancing detection in a specified area. The method includes: locating a positioning quadrangle plane in the specified area; obliquely capturing an image of the specified area to generate a captured image of the specified area; defining a coordinate conversion function according to raw coordinates of selected points of the positioning quadrangle plane in the captured image of the specified area and preset reference coordinates of the selected points of the positioning quadrangle plane; converting raw coordinates of the captured image of the specified area into converted coordinates by way of the coordinate conversion function; determining a physical-distancing condition between two persons according to the converted coordinates; and issuing a warning signal if the physical-distancing condition is not satisfied.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
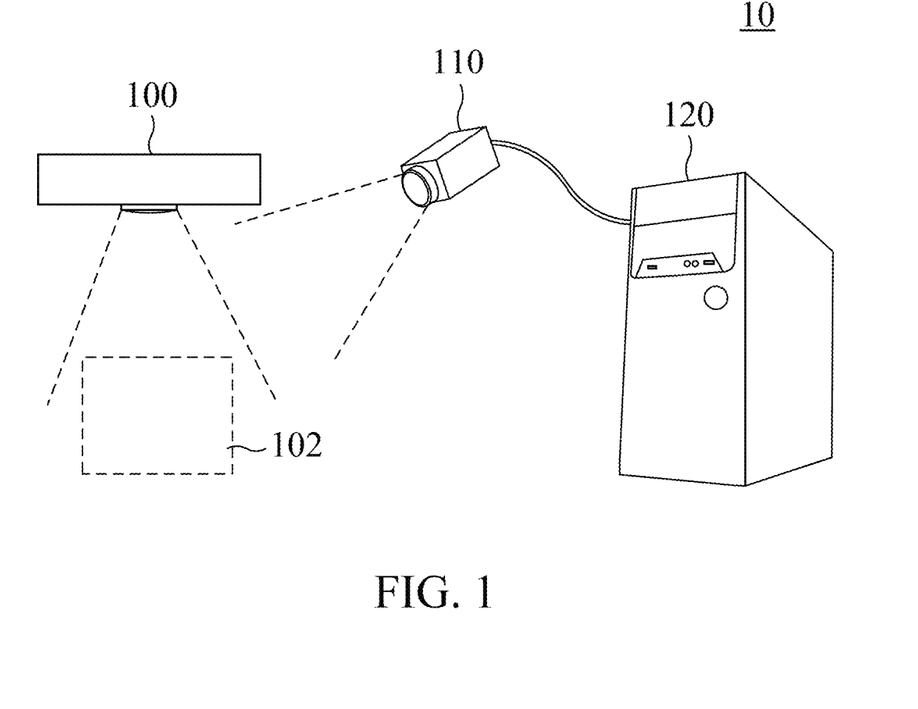
FIG. 1 is a schematic diagram illustrating a system for physical-distancing detection in a specified area according to an embodiment of the present invention.

Referring to FIG. 1, a system for physical-distancing detection in a specified area according to an embodiment of the present invention is schematically illustrated. In this embodiment, the system 10 includes an image-capturing device 110 for executing the image analysis technology. The image-capturing device 110 is generally installed at a corner or an inconspicuous location, so it is generally disposed obliquely relative to the specified area, and captures an oblique image of the specified area. As known to those ordinary in the art, an oblique image would be unable to reveal the actual physical-distancing condition, so the image-capturing device 110 converts the coordinates of the oblique image into coordinates of an overlooked image, which represents an image viewed right above the specified area. The conversion of coordinates is performed according to a coordinate conversion function provided by a coordinate converter 120, which is also included in the system 10 and may be, for example, a software program. Once the coordinates of the overlooked image are determined, they can be used for calculating distances between persons nearby.

Figure 2:
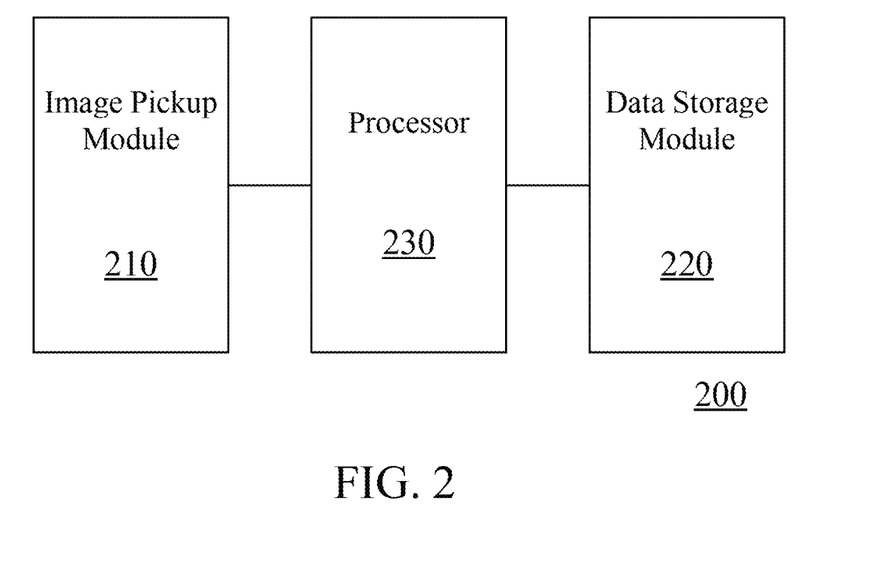
FIG. 2 is a functional block diagram illustrating an image-capturing device adapted to be used in the system of FIG. 1.

An image-capturing device adapted to be used in the system for physical-distancing detection according to an embodiment of the present invention is illustrated by referring to the functional block diagram of FIG. 2. The image-capturing device 200 in this embodiment includes an image pickup module 210, a data storage module 220 and a processor 230. The image-capturing device 200 is installed at a proper position so that the image pickup module 210 can capture an image of the specified area. The image pickup module 210 may be any suitable camera device. For example, it may be an IP cam, a USB cam, or a Webcam. The data storage module 220 stores therein raw data of the captured image and, in addition, the coordinate conversion function provided by the coordinate converter 120. The data storage module may be, for example, a local hard drive or a cloud storage. The processor 230, e.g., a software program, performs coordinate conversion from the coordinates of the oblique image into the coordinates of the overlooked image according to the coordinate conversion function stored in the data storage module 220. The resulting converted coordinates are also stored into the data storage module 220. The physical-distancing condition can thus be realized according to the converted coordinates. It is to be noted that the image-capturing device 200 may be used as the image-capturing device 110 of FIG. 1, which is an independent device from the coordinate converter 120. Alternatively, the image-capturing device 200 can be integrated with the coordinate converter 120 into one device. In this case, the operation of the coordinate converter 120 for defining the coordinate conversion function can be executed by the processor 230.

Hereinafter, how the coordinate conversion function is defined and how the distances are calculated will be described in more detail with reference to the following embodiments and examples.

Figure 3A:
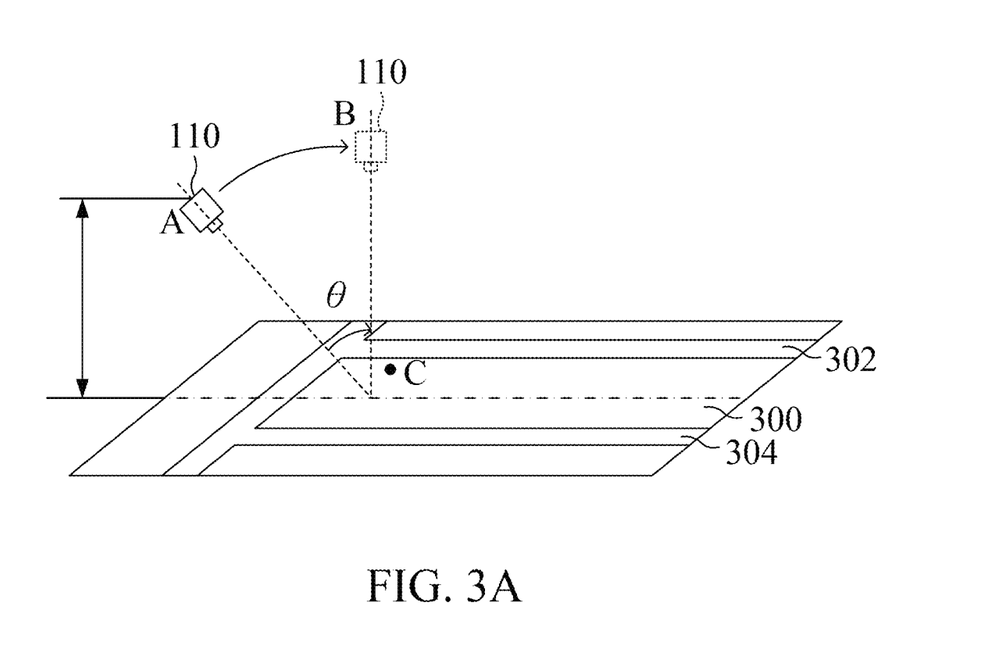
FIG. 3A is a schematic diagram illustrating the disposition of an image-capturing device at a position A to capture an image of a specified area according to an embodiment of the present invention.
Figure 3B:
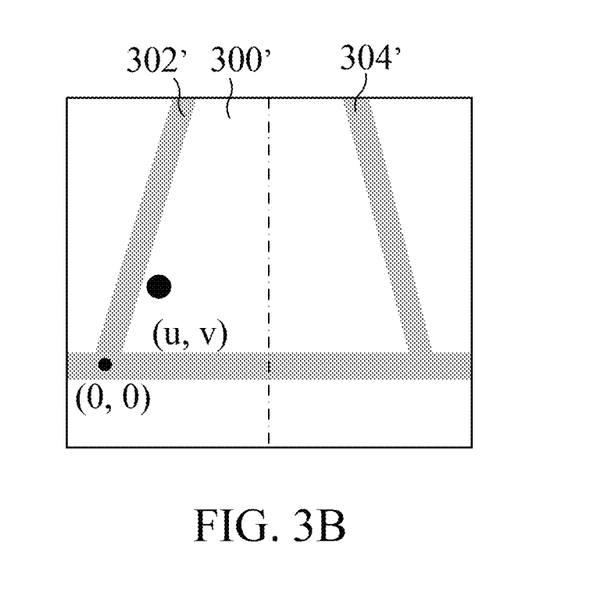
FIG. 3B is a scheme illustrating the captured image of the specified area under the configuration of FIG. 3A.
Figure 3C:
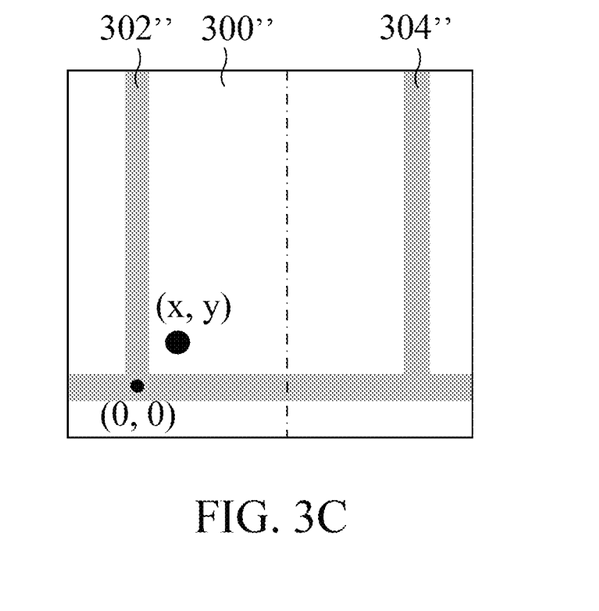
FIG. 3C is a scheme illustrating an image converted from the captured image of the specified area under the configuration of FIG. 3A.

FIGS. 3A-3C cooperatively illustrate how the coordinate conversion is performed by the processor 230 according to an embodiment of the present invention. FIG. 3A is a scheme illustrating the disposition of the image-capturing device relative to the specified area. The image-capturing device 110 in this example is installed at a position A, which deflects at an angle θ from a normal line of a plane of the specified area 300. It is to be noted that the distance and orientation of the image-capturing device relative to the specified area shown in FIG. 3A is for illustration only, and the image-capturing device can be disposed in any other proper distance and orientation, as long as the image of objects in the specified area can be well captured, in order to conduct the physical-distancing detection according to the present invention. For example, as shown in FIG. 3A, two strips 302 and 304 are actually parallel to each other in the specified area 300. However, since the image-capturing device at the position A captures the image of the specified area 300 obliquely, the two strips 302 and 304 become visually closer to each other at distant ends, as illustrated in FIG. 3B. For precise physical-distancing detection, it is required that the image of the specified area 300 is overlooked, i.e., viewed right above as at the position B. That is, the two strips 302 and 304 should be visually parallel to each other, as shown in FIG. 3C.

Likewise, in another example that the image-capturing device 110 is installed at another position (not shown in the drawings) instead of the position A and deflects from the normal line of the plane of the specified area at another angle instead of the angle θ (not shown), the relative configuration of the two strips 302 and 304 in the captured image of the specified area would be different from that shown in FIG. 3B. However, after being properly converted, an image of the specified area 300 similar to that shown in FIG. 3C can still be obtained for physical-distancing detection. The conversion from the oblique image 300' as shown in FIG. 3B into the overlooked image 300" as shown in FIG. 3C is conducted by way of coordinate conversion according to the present invention.

For example, the point at the left lower corner of the captured image 300' (FIG. 3B) and the point at the left lower corner of the converted image 300" (FIG. 3C) are both set to be origins, i.e., coordinate (0,0). Meanwhile, a point C in the specified area 300 shown in FIG. 3A is represented with a coordinate (u,v) in the captured image 300' (FIG. 3B) but represented with a different coordinate (x,y) in the converted image 300" (FIG. 3C). The conversion from the coordinate (u,v) into the coordinate (x,y) is performed with the above-mentioned coordinate conversion function defined by the coordinate converter 120. As described previously, the coordinate conversion function defined by the coordinate converter 120 will be provided for the image-capturing device 110 or 200 and, for example, stored in the data storage module 220.

Figure 4A:
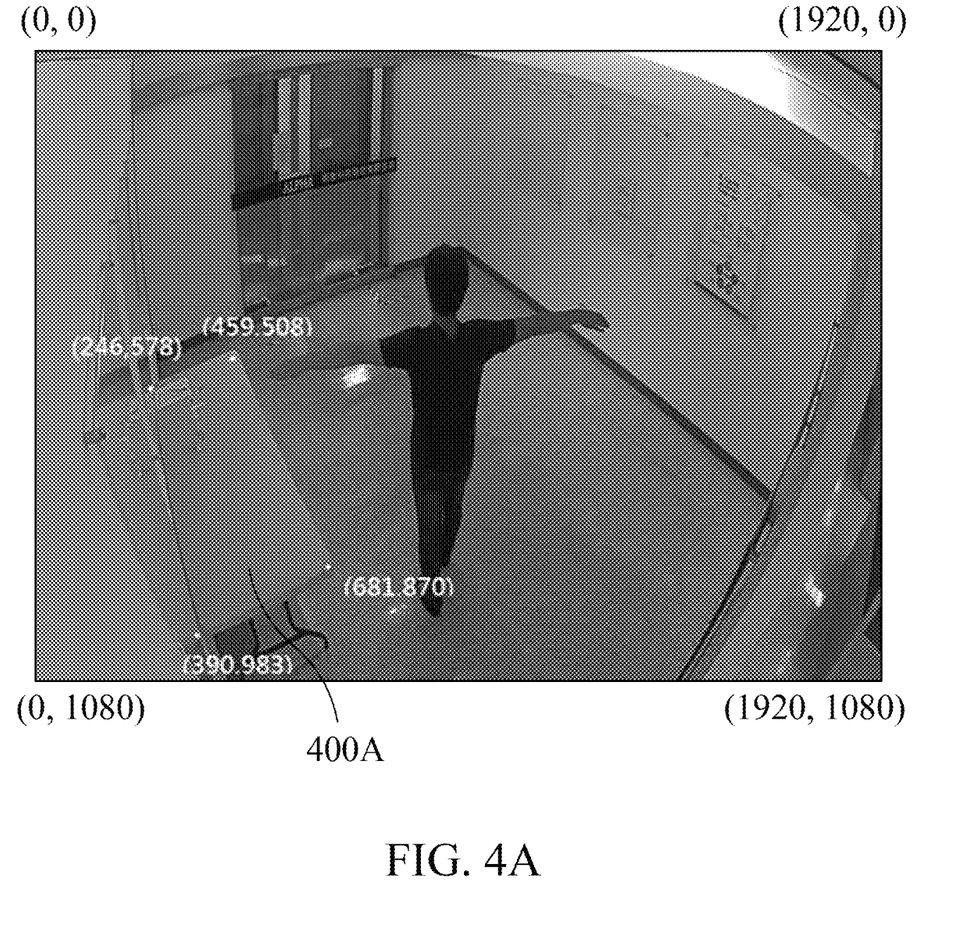
FIG. 4A is a picture illustrating an obliquely captured image of a specified area labelled with raw coordinates of four vertices of the specified area and four vertices of a positioning quadrangle plane in the specified area.
Figure 4B:
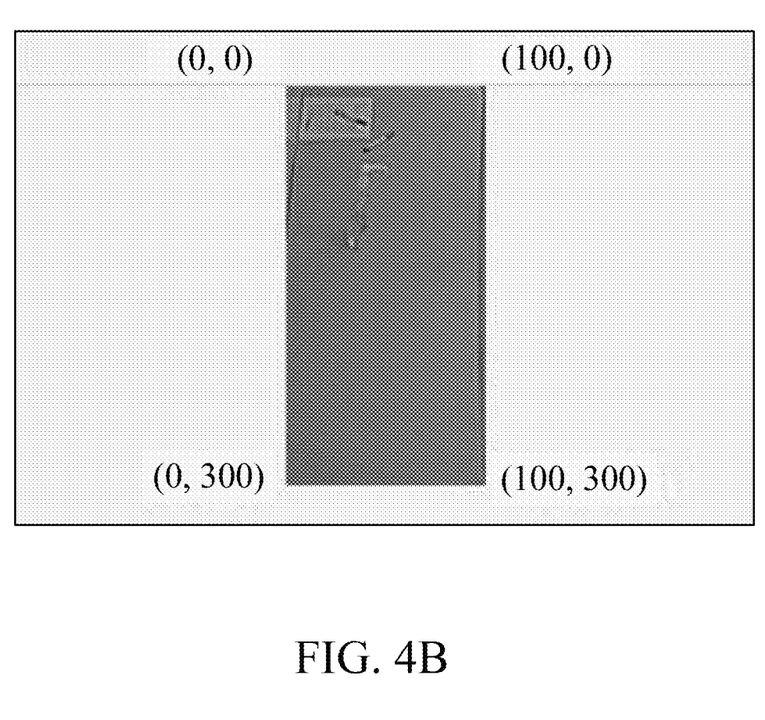
FIG. 4B is a picture illustrating an overlooked image of the positioning quadrangle plane of FIG. 4A labelled with reference coordinates of the four vertices of the positioning quadrangle plane.
Figure 4C:
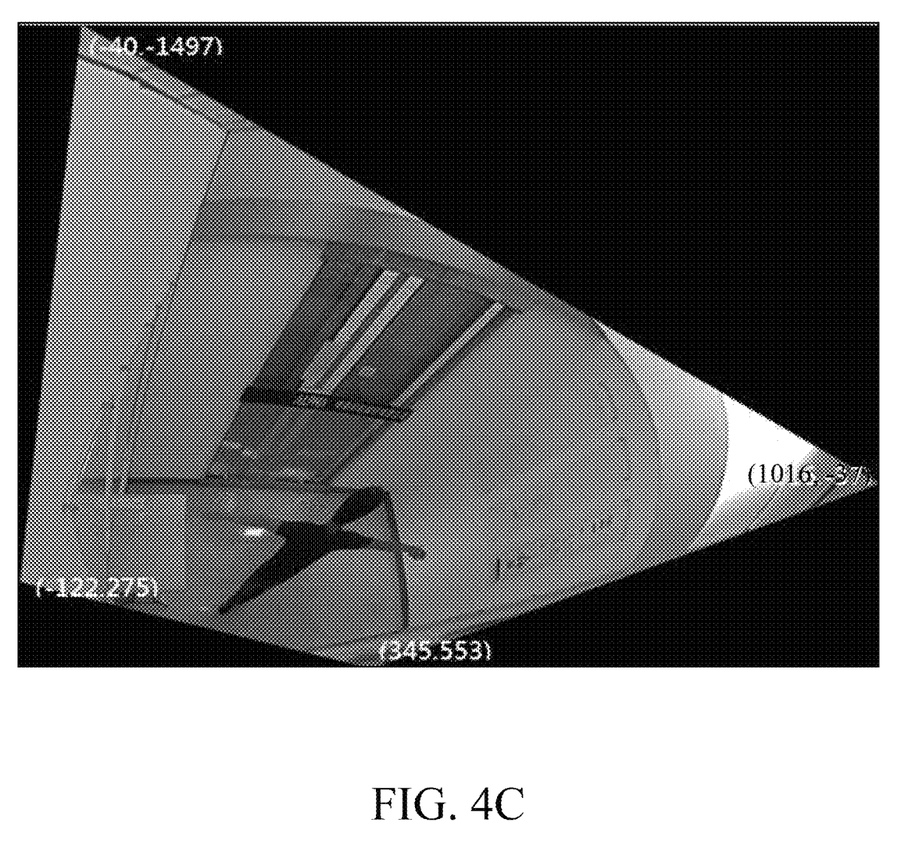
FIG. 4C is a picture illustrating an image of the specified area of FIG. 4A converted from the captured image by way of a coordinate conversion function according to an embodiment of the present invention and labelled with converted coordinates of the four vertices of the specified area.

Hereinafter, the pictures of FIGS. 4A-4C are referred to for exemplifying how the coordinate conversion function is defined and how the coordinates are converted.

First of all, please refer to FIG. 1 again. The system 10 further includes a locator 100. The locator 100 locates a positioning quadrangle plane 102 in the specified area, which is parallel to the ground of the specified area. The positioning quadrangle plane 102 may be any available one existing in the specified area and can be caught by the image-capturing device 110. For illustration only, some examples are given herein. In a specific example, the locator 100 is a projector, and the positioning quadrangle plane 102 is a quadrangle image projected on the ground. In another specific example, the locator 100 is a quadrangle table, and the positioning quadrangle plane 102 is the surface of the quadrangle table. In a further specific example, the locator 100 is a quadrangle parking space painted on the ground, and so is the positioning quadrangle plane 102. The quadrangle in this embodiment is a rectangle, but may be another well-defined quadrangle in another embodiment. In this embodiment, four positioning points are located to cooperatively define the positioning quadrangle plane 102. The four positioning points may be the four vertices of the positioning quadrangle plane 102. Alternatively, the four positioning points may be respective midpoints of the four edges of the positioning quadrangle plane 102, or any other specifically designated points of the positioning quadrangle plane 102.

FIG. 4A is an example of a picture captured by the image-capturing device and showing the image of the specified area. In the example shown in FIG. 4A, a rectangular table 400A exists in the specified area, which can be used as the locator 100 to locate the positioning quadrangle plane 102, e.g., the surface of the rectangular table 400A, for defining the coordinate conversion function. At first, reference coordinates of the four vertices of the rectangular table 400A are determined by or inputted into the coordinate converter 120 in advance. For example, as shown in FIG. 4B, the reference coordinates (0,0), (100,0), (100,300) and (0,300) are inputted to indicate the four vertices of the overlooked rectangular table 400A. Afterwards, when physical-distancing detection in the specified area is performed, the image of the specified area is captured by the image-capturing device 110, and the captured image of the specified area is sent from the image-capturing device 110 to the coordinate converter 120. From the captured image of the specified area, the coordinate converter 120 determines that the four vertices of the rectangular table 400A in the captured image of the specified area correspond to raw coordinates (246,578), (459,508), (681,870) and (390,983). Then the coordinate conversion function can be defined based on the raw coordinates (246,578), (459,508), (681,870) and (390,983) and the reference coordinates (0,0), (100,0), (100,300) and (0,300) of the four vertices of the rectangular table 400A. In other words, through the operation of the coordinate conversion function f(m,n), the raw coordinate (246,578) can be converted into the reference coordinate (0,0); the raw coordinate (459,508) can be converted into the reference coordinate (100,0); the raw coordinate (681,870) can be converted into the reference coordinate (100,300); and the raw coordinate (390,983) can be converted into the reference coordinate (0,300).

After the coordinate conversion function is defined, the physical-distancing detection can be performed as illustrated in FIGS. 3A-3C and as described above. FIG. 4C shows an image of the specified area converted from the captured image shown in FIG. 4A by way of the above-defined coordinate conversion function f(m,n). For example, the raw coordinates (0,0), (1920,0), (1920,1080) and (0,1080) of the four vertices of the specified area in the captured image are converted into coordinates (−40,−1497), (1016,−37), (345, 553) and (−122,275), respectively, be way of the coordinate conversion function f(m,n). It can be seen that the converted image of the specified area is not a rectangle anymore. Subsequently, coordinates of all the other points in the converted image of the specified area can be obtained from the four converted coordinates (−40,−1497), (1016,−37), (345,553) and (−122,275). As a result, if the processor 230 uses a currently available or newly developed artificial-intelligence image analysis technology to determine that there are two or more persons in the specified area, each of the persons can be located and a distance between any two persons can be realized.

For example, the processor 230 first sets up a frame to cover each person of interest. The frame is of a well-defined shape and the person is basically centrally disposed in the frame. A middle point of an edge of the frame under the feet of a first person corresponds to a first coordinate, so the first coordinate is used to represent the position of the first person. Likewise, a second coordinate of a middle point of an edge of the frame under the feet of a second person is used to represent the position of the second person. Then the distance between the first and second persons can be calculated by operating the first and second coordinates.

Figure 4D:
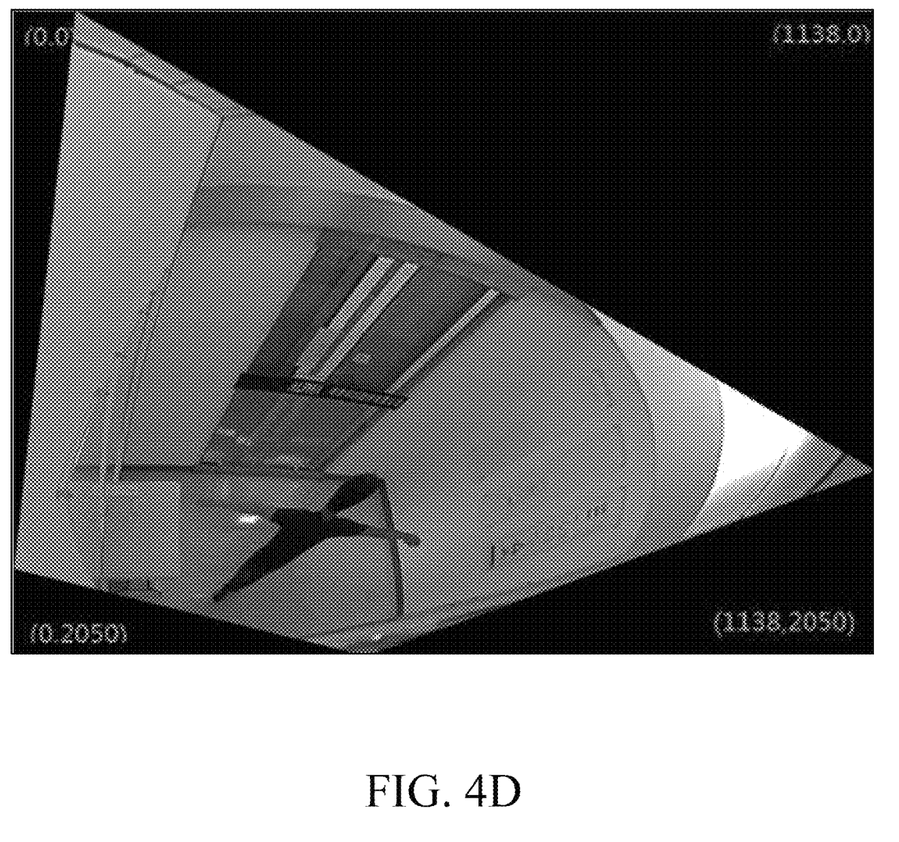
FIG. 4D is a picture illustrating the same image of the specified area as that of FIG. 4C but labelled with re-defined coordinates of the four vertices of an extensive rectangular area covering the specified area.
Figure 4E:
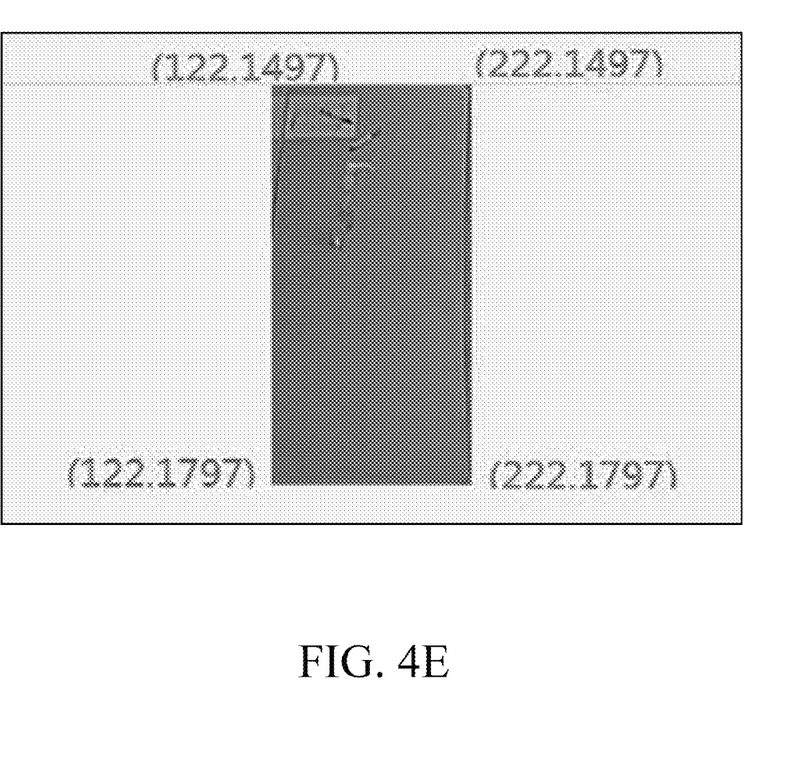
FIG. 4E is a picture illustrating an overlooked image of the positioning quadrangle plane of FIG. 4D labelled with re-defined reference coordinates of the four vertices of the positioning quadrangle plane.

It is to be understood that the numerals of coordinates given as above are for expressing relative positions of the points and for illustration only. An alternative coordinate system may also be used in another embodiment. For example, according to the four coordinates (−40,−1497), (1016,−37), (345,553) and (−122,275) of the converted image of the specified area, which has become non-rectangular, an extensive rectangular area covering the entire converted image of the specified area can be defined, as shown in FIG. 4D, wherein the vertical length of the extensive image is 553−(−1497)=2050, and the traverse length of the extensive image is 1016−(−122)=1138. Therefore, the four vertices of the extensive rectangular area may be set to correspond to coordinates (0,0), (1138,0), (1138, 2050) and (0,2050), respectively. Under this coordinate system, coordinates of the four vertices of the rectangular table 400A are changed into (122,1497), (222,1497), (222, 1797) and (122,1797), as shown in FIG. 4E, which become new reference coordinates of the four vertices of the rectangular table 400A. According to the raw coordinates (246, 578), (459,508), (681,870) and (390,983) and the newly defined reference coordinates (122,1497), (222,1497), (222, 1797) and (122,1797) of the four vertices of the rectangular table 400A, a new coordinate conversion function g(m,n) different from the above-defined coordinate conversion function f(m,n) is defined. The newly-defined coordinate conversion function g(m,n) is then used for physical-distancing detection under this coordinate system, It is also to be understood that if the image-capturing device is installed at another position, i.e. the distance and/or orientation of the image-capturing device relative to the specified area are changed, the coordinate conversion function would be different from the coordinate conversion function f(m,n) and g(m,n), too.

According to the present invention, the process for determining the coordinate conversion function may be executed only once. As long as the image-capturing device and the position of the image-capturing device are not changed, the coordinate conversion function can be stored in the image-capturing device, e.g. in the data storage module 220 shown in FIG. 2, and used by the processor 230 for any subsequent coordinate conversion. The processor 230 determines whether the physical-distancing condition between two persons nearby is satisfied by processing the raw coordinates of the captured image of the specified area with the pre-defined coordinate conversion function. The physical-distancing condition is determined to be unsatisfied whenever a distance between any two persons is less than a prescribed length. In response to the physical-distancing condition, a warning signal can be issued for notification. For example, the warning signal may be an audible signal sent from the processor to a sounding module (not shown) included in the image-capturing device to make a preset pattern of sound or voice. In another example, the warning signal may be sent from the processor to a display module included in the image-capturing device or to an external display device to specify the persons between which the physical-distancing condition is not satisfied. Alternatively, the warning signal may be sent from the processor to an application program associated with the image-capturing device or the system to present a suitable type of prompt.

It is to be noted that the above-mentioned prescribed length for determining whether the physical-distancing condition is satisfied may be a preset value pre-stored in the data storage module. Alternatively, it may vary with the site condition. For example, it may be derived from an information of an object existing in the specified area; it may correlate to, e.g. equal to, a length of an edge of the positioning quadrangle plane; it may correlate to, e.g. equal to, an interval between two stickers attached on the ground of the specified area; it may be indicated with a pattern marked on the ground of the specified area; it may correlate to a size, e.g. equal to a known length, of an object existing in the specified area; or it may correlate to a feature of a person in the specified area, e.g., e.g. equal to twice the arm length.

It is understood from the above descriptions that the image-capturing device and the system for physical-distancing detection according to the present invention utilizes image conversion and coordinate conversion to calculate a distance between two objects or persons nearby, determine whether a physical-distancing condition is satisfied or not, and issue a warning signal when the physical-distancing condition is not satisfied. Therefore, by using the above-mentioned technology, the staff can easily detect and maintain the physical distancing condition between people in the crowd.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image-capturing device adapted to be used for physical-distancing detection, comprising:
    an image-pickup module configured to obliquely capture an image of a specified area to generate a captured image of the specified area;
    a data storage module configured to store therein a coordinate conversion function; and
    a processor coupled to the image-pickup module and the data storage module, and converting raw coordinates of the captured image of the specified area into converted coordinates of an overlooked image of the specified area by way of the coordinate conversion function, wherein the raw coordinates of the captured image includes at least a first raw coordinate and a second raw coordinate, the converted coordinates of the overlooked image includes at least a first converted coordinate and a second converted coordinate, which correlate to the first raw coordinate and the second raw coordinate of the captured image, respectively, and a spatial relationship between the first converted coordinate and the second converted coordinate differs from a spatial relationship between the first raw coordinate and the second raw coordinate,
    wherein a physical-distancing condition between two persons is automatically determined by the processor according to the spatial relationship between the first converted coordinate and the second converted coordinate, and an action corresponding to the physical-distancing condition is automatically taken by the image-capturing device.

2. The image-capturing device according to claim 1, wherein the physical-distancing condition is determined to be unsatisfied if the converted coordinates show that a distance between the two persons is less than a prescribed length that is twice an arm length of any person in the specified area.

3. The image-capturing device according to claim 1, wherein the physical-distancing condition is determined to be unsatisfied if the converted coordinates show that a distance between the two persons is less than a prescribed length that is indicated with a pattern marked on a ground of the specified area.

4. The image-capturing device according to claim 1, wherein the physical-distancing condition is determined to be unsatisfied if the converted coordinates show that a distance between the two persons is less than a prescribed length that is equal to a known length of an object existing in the specified area.

5. The image-capturing device according to claim 1, wherein the action corresponding to the physical-distancing condition that is unsatisfied includes issuing a warning signal.

6. The image-capturing device according to claim 1, wherein the action further includes making a preset pattern of sound or voice in response to the warning signal.

7. The image-capturing device according to claim 1, wherein the action further includes specifying the persons between which the physical-distancing condition is not satisfied on a display.

8. The image-capturing device according to claim 1, wherein the action further includes presenting a prompt by an application program associated with the image-capturing device.

9. A system for physical-distancing detection in a specified area, comprising:
    a locator configured to locate a positioning quadrangle plane in the specified area;
    an image-capturing device configured to obliquely capture an image of the specified area to generate a captured image of the specified area; and
    a coordinate converter configured to define a coordinate conversion function according to raw coordinates of selected points of the positioning quadrangle plane in the captured image of the specified area and reference coordinates of the selected points of the positioning quadrangle plane in an overlooked image of the specified area,
    wherein the image-capturing device converts raw coordinates of the captured image of the specified area into converted coordinates of the overlooked image of the specified area by way of the coordinate conversion function, automatically determines a physical-distancing condition between two persons according to a spatial relationship between two of the converted coordinates, and automatically takes an action corresponding to the physical-distancing condition.

10. The system according to claim 9, wherein the reference coordinates are inputted into the coordinate converter in advance.

11. The system according to claim 9, wherein the selected points are four vertices of the positioning quadrangle plane.

12. The system according to claim 9, wherein the coordinate conversion function varies with a position of the image-capturing device relative to the specified area.

13. The system according to claim 9, wherein the physical-distancing condition is determined to be unsatisfied if the converted coordinates show that a distance between the two persons is less than a prescribed length that is twice an arm length of any person in the specified area.

14. The system according to claim 9, wherein the physical-distancing condition is determined to be unsatisfied if the converted coordinates show that a distance between the two persons is less than a prescribed length that is indicated with a pattern marked on a ground of the specified area.

15. The system according to claim 9, wherein the physical-distancing condition is determined to be unsatisfied if the converted coordinates show that a distance between the two persons is less than a prescribed length that is equal to a known length of an object existing in the specified area.

16. The system according to claim 9, wherein the action corresponding to the physical-distancing condition that is unsatisfied includes issuing a warning signal.

17. The system according to claim 9, wherein the action further includes making a preset pattern of sound or voice in response to the warning signal.

18. The system according to claim 9, wherein the action further includes specifying the persons between which the physical-distancing condition is not satisfied on a display.

19. The system according to claim 9, wherein the action further includes presenting a prompt by an application program associated with the image-capturing device.

20. A method for physical-distancing detection in a specified area, comprising:
- configuring a locator to locate a positioning quadrangle plane in the specified area;
- configuring an image-pickup device to obliquely capture an image of the specified area to generate a captured image of the specified area;
- configuring a coordinate converter to be communicable with the locator and the image-pickup device,
- the coordinate converter defining a coordinate conversion function according to raw coordinates of selected points of the positioning quadrangle plane in the captured image of the specified area and preset reference coordinates of the selected points of the positioning quadrangle plane;
- the coordinate converter converting raw coordinates of the captured image of the specified area into converted coordinates by way of the coordinate conversion function;
- the coordinate converter automatically determining a physical-distancing condition between two persons according to a spatial relationship between two of the converted coordinates; and
- the coordinate converter automatically issuing a warning signal if the physical-distancing condition is not satisfied.

* * * * *